United States Patent
Bauer et al.

(10) Patent No.: US 8,852,324 B2
(45) Date of Patent: Oct. 7, 2014

(54) VENTING DEVICE FOR A HOUSING AND METHOD FOR PRODUCING SAME

(75) Inventors: Sascha Bauer, Auenwald (DE); Stefan Maier, Besigheim (DE); Robert Zbiral, Marbach (DE); Markus Beylich, Ludwigsburg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 195 days.

(21) Appl. No.: 13/437,576

(22) Filed: Apr. 2, 2012

(65) Prior Publication Data

US 2012/0247338 A1 Oct. 4, 2012

(30) Foreign Application Priority Data

Apr. 4, 2011 (DE) .......................... 10 2011 015 981

(51) Int. Cl.
*B01D 53/22* (2006.01)
*B01D 19/00* (2006.01)
*H01M 2/12* (2006.01)
*B01D 63/14* (2006.01)
*B01D 67/00* (2006.01)

(52) U.S. Cl.
CPC ............. *H01M 2/1288* (2013.01); *B01D 63/14* (2013.01); *B01D 19/0031* (2013.01); *B01D 67/0086* (2013.01); *H01M 2/1241* (2013.01); *Y02E 60/12* (2013.01)
USPC ........... 96/6; 96/11; 95/46; 55/385.4; 55/521; 29/446

(58) Field of Classification Search
CPC ............... B01D 19/0031; B01D 63/14; B01D 67/0086; B01D 69/12; B01D 2257/102; B01D 2257/104; B01D 2257/108; H01M 2/12; H01M 2/1241; H01M 2/1288; Y02E 60/12
USPC ........ 96/4, 6, 11; 95/46, 47, 54, 55; 55/385.1, 55/385.4, 521; 29/446; 429/82
See application file for complete search history.

(56) References Cited

U.S. PATENT DOCUMENTS

| | | | | |
|---|---|---|---|---|
| 3,909,302 | A * | 9/1975 | Mermelstein | ........................ 96/6 |
| 4,180,624 | A | 12/1979 | Winsel | |
| 4,326,957 | A * | 4/1982 | Rosenberg | .......................... 96/6 |
| 5,348,570 | A * | 9/1994 | Ruppert et al. | ...................... 96/6 |
| 5,522,769 | A * | 6/1996 | DeGuiseppi | ......................... 96/6 |
| 6,514,324 | B1 * | 2/2003 | Chapman | ......................... 55/521 |
| 6,579,457 | B1 * | 6/2003 | Ehrnsperger et al. | ............... 96/6 |

(Continued)

FOREIGN PATENT DOCUMENTS

DE 2804583 A1 8/1979

OTHER PUBLICATIONS

German Office Action on priority application DE 10 2011 015 981.9, Jan. 26, 2012.

*Primary Examiner* — Jason M Greene
(74) *Attorney, Agent, or Firm* — James Hasselbeck

(57) ABSTRACT

A venting device for a housing, for example, a battery housing, has a gas-permeable and liquid-impermeable membrane attached to the housing so as to close off a venting opening of the housing. The membrane has a membrane section that overlaps and covers the venting opening. The membrane section has a predetermined bursting pressure. The membrane section deforms without being destroyed when pressure differences between the interior of the housing and the environment occur that are below the bursting pressure and when gas passes through the membrane section.

23 Claims, 3 Drawing Sheets

(56) References Cited

U.S. PATENT DOCUMENTS

| | | |
|---|---|---|
| 7,491,258 B2 * | 2/2009 | Gouzou et al. .................... 96/6 |
| 2001/0037629 A1 * | 11/2001 | Mashiko et al. ............. 55/385.1 |
| 2002/0170434 A1 * | 11/2002 | Kawano et al. ................... 96/11 |
| 2006/0228620 A1 * | 10/2006 | Martinson et al. .............. 429/56 |
| 2007/0039471 A1 * | 2/2007 | Hofmann ............................ 96/4 |

* cited by examiner

VENTING DEVICE FOR A HOUSING AND METHOD FOR PRODUCING SAME

CROSS REFERENCE TO RELATED APPLICATIONS

Priority is claimed based on German patent application no. 102011015981.9 filed in Germany on Apr. 4, 2011, the entire disclosure of which is incorporated herein by reference.

TECHNICAL FIELD

This disclosure relates generally to a venting device for housing with a gas-permeable membrane that is impermeable for liquids and closes off tightly a venting opening of the housing.

BACKGROUND OF THE INVENTION

The invention concerns a venting device for a housing, in particular a battery housing, in particular of a motor vehicle, with a gas-permeable membrane that is impermeable for liquids and that is attached to the housing and closes off tightly a venting opening of the housing.

Moreover, the invention concerns a method for producing a venting device of a housing, in particular a battery housing, in particular of a motor vehicle, in which a gas-permeable membrane that is impermeable for liquids is attached flat with a membrane edge to the housing so that it closes off tightly a venting opening of the housing.

Venting systems of batteries for electric vehicles are known in the market. These venting systems have the function to compensate pressure fluctuations, caused in the battery housing during operation, in that gas from the battery housing can pass to the exterior through the venting system or air can flow into the battery housing from the exterior. This pressure compensation prevents that the battery housing is permanently plastically deformed and possibly becomes leaky. The venting system has a venting opening for the battery housing. The venting opening is covered by a flat rigid membrane that is permeable for gasses, in particular air, and gasses that are produced during operation of the battery. The membrane is impermeable for liquids, in particular water and battery acid. In this way, it is prevented that liquid out of the environment can flow into the battery housing and vice versa. Often it is necessary, for constructive or functional reasons, to arrange the venting system at the bottom side of the motor vehicle so that it is exposed to water and dirt, in particular mud, of the environment. In particular when used in off-road conditions, the venting system can become soiled to such an extent that its function is impaired. During standstill, the mud can form a crust on the membrane which causes a permanent impairment of the function of the venting system.

SUMMARY OF THE INVENTION

An object of the invention is to provide a venting device of the aforementioned kind and a method for producing the same in which the functionality of the venting device during operation is improved. In particular, the venting device should be self-cleaning.

In accordance with the present invention, this is achieved in that the membrane section that overlaps and covers the venting opening is deformable so that it will deform, without being destroyed, when pressure differences between the interior of the housing and the environment occur that are below a predetermined bursting pressure and when gas passes through.

According to the invention, the section of the membrane which covers the venting opening of the housing is itself deformable. In this way, the membrane section upon pressure fluctuations in the housing can be deflected inwardly or outwardly, depending on whether underpressure or overpressure exists relative to the environmental pressure. The passage of gas has the effect that the membrane section will flutter in the gas flow. Because of this deformation, soil deposits, in particular dirt and dried mud at the exterior side of the membrane section are broken up, loosened and thrown off. The membrane cleans itself in this way. A further advantage is that pressure fluctuations in the housing in a predetermined pressure range that is defined by the level of deformation of the membrane section is compensated solely by the deformation of the membrane section. Only at greater pressure fluctuations, a further pressure compensation by a venting action takes place by means of gas, in particular air, passing through the membrane. In this connection, because of the impermeability of the membrane with respect to liquid, it is always prevented that liquid, in particular water, can pass into the housing from the environment and vice versa. According to the invention, the deformability of the membrane and its permeability for gas is combined optimally so that always an optimal pressure compensation takes place in the housing. The membrane section can be designed furthermore such that, when a burst overpressure or burst underpressure in the housing is surpassed, the membrane will burst in order to prevent destruction of the housing.

The venting device according to the invention can be used in battery housings, in particular in electric vehicles. It can also be used for venting other types of housings, in particular switch boxes or switch cabinets, in which, during operation, overpressure is produced in the housing that must be compensated; in this connection, it must always be prevented that moisture from the environment can pass through the venting device into the housing.

Advantageously, the membrane section can have an appropriate thickness that depends on the material. The axial thickness of the membrane can be advantageously approximately 0.5 mm. It can also be greater or smaller than 0.5 mm. By appropriate selection of the thickness, a robust membrane section can be realized that is still deformable. The level of deformation and the burst pressure at which the membrane section will burst can be simply predetermined by means of the thickness of the membrane.

In an advantageous embodiment, the deformation is achieved in that at least the membrane section is elastic. In this connection, the elasticity is predetermined such that already a minimal pressure difference and/or a minimal gas flow through the membrane is sufficient to cause the membrane section to flutter and deform thereby.

Advantageously, the surface area or size (square dimension) of the membrane section can be greater than the cross sectional area of the bore or inner width of the venting opening. In this way, the membrane section can be placed across the venting opening and secured on the housing free of any tension. Already small pressure differences are sufficient in order to deform the membrane section, in particular to cause it to flutter or to deflect inwardly or outwardly. The membrane section can be elastically deformable. However, it can also be inelastically deformable.

In a further advantageous embodiment, the membrane section can be folded, corrugated or embossed, in particular can be provided with grooves. In this way, the shape of the membrane section can be changed in a simple way. The volume that is delimited by the membrane section can be varied by its large expanse or size that is folded in wider ranges than would be the case for a membrane section loosely stretched across the venting opening. In this way, greater pressure differences in the housing can be compensated by volume changes due to flexure or non-destructive deformation of the membrane section without gas flow gas flow required through the membrane.

Preferably, the membrane section can be folded in a Z-shape or an S-shape. A Z-shape fold can be realized in a simple way. An S-shape fold enables a uniform deformation of the membrane section. An S-shape fold has no dead spaces where dirt could collect.

Moreover, advantageously fold edges of the folds or the grooves can extend parallel to each other and transversely to an axis of the venting opening; in particular, in an operational orientation of use of the battery and its housing, the membrane section can be substantially vertically oriented and the fold edges of the folds or the grooves can extend horizontally. So-called transverse folds in which the folds extend parallel to each other and transversely across the venting opening can be easily realized. When pressure fluctuations occur, the folds unfold and fold in an accordion-like fashion so that the total volume that is formed together with the interior of the housing is correspondingly enlarged or decreased. Upon changeover from overpressure to underpressure or vice versa, the membrane section can also be deflected in the opposite direction. For folding, unfolding and deflection inward or outward, the entire membrane section is deformed so that dirt deposits of the entire surface area are broken up and thrown off. A substantially vertically oriented membrane section has the advantage that loosened dirt and moisture can flow or fall vertically downwardly. Collection of dirt and moisture on the surfaces of the membrane section is prevented in this way.

Alternatively, advantageously folded edges of the folds or the grooves may extend along closed curves, in particular curves of rotational symmetry. In this way, the membrane section can deflect like a spherical cap so as to project more or less inwardly into the housing or outwardly from the housing, depending on the pressure difference between environment and the interior of the battery housing.

In a further advantageous embodiment, outer intermediate fold spaces of the folds from a dirt side of the membrane section that is facing away from the interior of the housing to a side of the membrane section that is facing the interior of the housing can extend at a slant, in particular at an angle of at least 30 degrees, relative to an axis of the venting opening. This has the advantage that dirt is caught at the dirt side. By the slanted arrangement of the intermediate fold spaces it is prevented that the dirt can pass to the bases of the folds of the outer intermediate fold spaces. Moisture and dirt that have entered the intermediate fold spaces can flow or slide out simply downwardly out of the intermediate fold spaces that are slanted outwardly and downwardly.

In a further advantageous embodiment, the membrane can be of a multi-layer configuration, in particular can be comprised of a coarse layer, in particular of nonwoven material, on the exterior side and a fine layer, in particular of a gas-permeable membrane material, on the inner side. With the coarse layer, large dirt particles can be caught at the exterior so that the fine layer is protected. The fine layer effects the gas permeability and liquid impermeability of the membrane.

The technical object is solved furthermore in accordance with the invention with respect to the method in that the housing is loaded with a controlled overpressure or underpressure relative to the environment so that a deformable membrane section that overlaps and covers the venting opening, is deflected inwardly or outwardly and, in this way, is provided with a permanent prestrain so that the surface of the membrane section is greater than the inner width or bore of the venting opening and the membrane section becomes deformable in this way.

According to the invention, the membrane can thus be stretched flat across the venting opening and attached to the housing. By loading of the housing with a predetermined overpressure or underpressure, the membrane is deflected outwardly or inwardly and is prestrained in this way. The membrane material is selected such that it has hysteresis so that the membrane section after having been prestrained will not assume again the flat or planar shape. The membrane section is essentially irreversibly overstretched and is then easily deformable. In other respects, the above mentioned features and advantages discussed in connection with the venting device according to the invention apply likewise to the method of the present invention.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
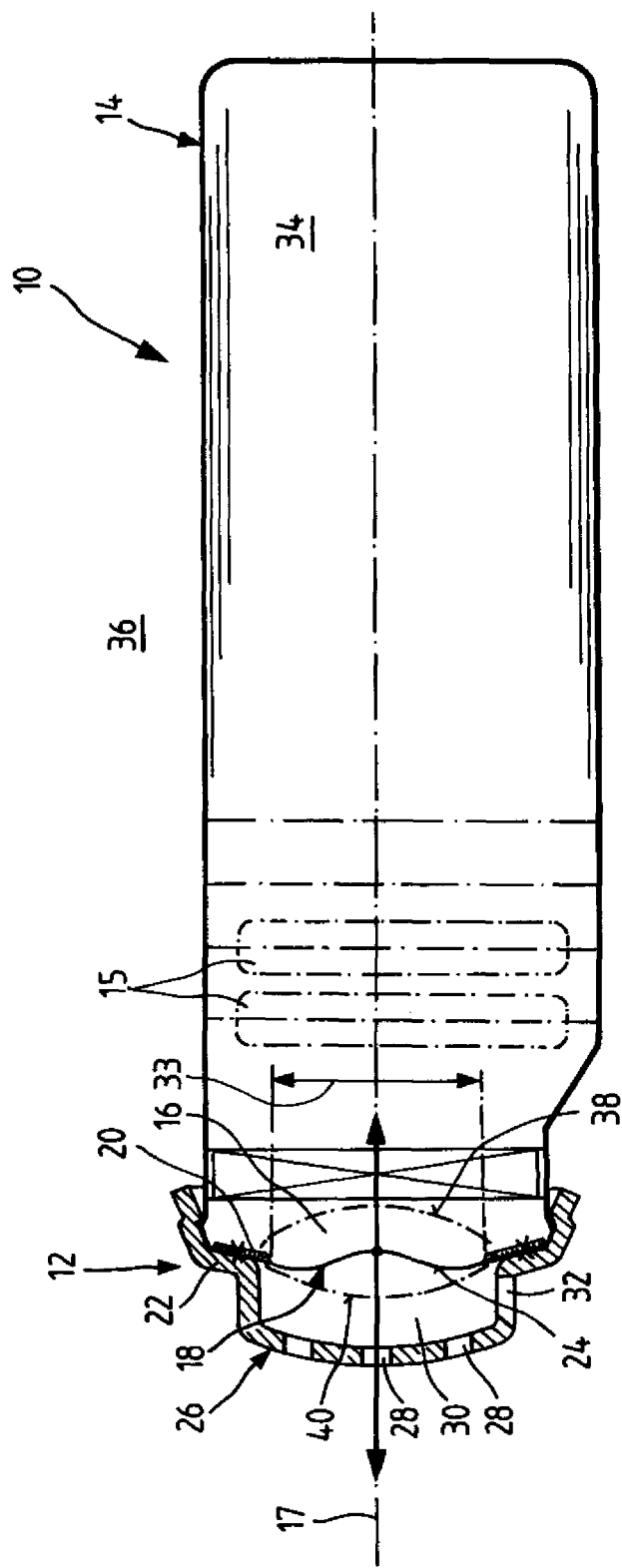
FIG. 1 shows schematically a section of a battery housing of a battery of an electric vehicle with a venting device that has a gas-permeable membrane in accordance with a first embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a venting device for a battery housing and methods of producing the disclosed venting device. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows a battery 10 of an electric vehicle in section. The battery 10 has a venting device 12 for a battery housing 14. With the venting device 12, pressure fluctuations caused in the battery housing 14 during operation are compensated. For example, during operation of the battery 10 the temperature in the battery housing 14 can rise so that the inner pressure is increased. Pressure changes in the battery housing 14, dependent on the configuration of the battery, can also be caused by chemical reactions during operation of the battery 10. Pressure changes in the battery housing 14 can also occur when the battery housing 14 is exposed to elevation changes, for example, when traveling across a mountain pass or when transported by airplane. By means of the venting device 12 it is prevented that the battery housing 14 is permanently plastically deformed and may become leaky.

In the battery housing 14, battery cells 15, not of interested in connection with the present invention, are arranged.

The venting device 12 comprises a venting opening 16 in the battery housing 14. The venting opening 16 is advantageously circular and has rotational symmetry relative to an imaginary axis 17. The axis 17 extends horizontally in the orientation of the battery 10 illustrated in FIG. 1 that corresponding to the regular position of use of the battery when the electric vehicle is horizontally positioned on a horizontal plane. In the following, the terms radial and axial relate to this axis 17.

In accordance with a first embodiment, the venting opening 16 is tightly closed by a membrane 18 that is gas-permeable but impermeable for liquids. The membrane 18 is embodied of a suitable axial thickness; the actual thickness depends on the type of material. For example, it has an axial thickness of 0.5 mm.

The membrane 18 is coated on the outer side that is facing away from the battery housing 14 (in FIG. 1 to the left) with a water-repellant coating so that adhesion of water and dirt is made more difficult.

The membrane 18 extends perpendicularly to the axis 17, i.e., substantially vertically in the regular orientation of the battery 10. The membrane 18 is attached with a peripheral radially outer membrane edge 20 to a housing section 22 of the battery housing 14; the housing section 22 surrounds the venting opening 16 circumferentially in radial outward direction.

A radial inner membrane section 24 of the membrane 18 covers the venting opening 60.

A cup-shaped protective cap 26 is pushed onto the battery housing 14 and covers the venting opening 16. The protective cap 26 protects the membrane 18 against dirt. At its bottom, the protective cap 26 has a plurality of passages 28 that open into an antechamber 30 in the interior of the protective cap 26. Through the passages 28, an air and liquid exchange between the antechamber 30 and the environment 36 takes place. At its lower end, the protective cap 26 has a discharge opening 32 through which dirt and liquid can fall out of the antechamber 30.

The surface area of the membrane section 24 is larger than the area of the bore (inner width) of the venting opening 60 that is indicated in FIG. 1 by arrow 33.

When pressure differences between the interior 34 of the battery housing 14 and the environment 36 occur in normal operation of the battery 10, the membrane section 24 is deformed by the pressure difference.

When an overpressure relative to the pressure in the environment 36 is generated in the interior 34, the membrane section 24 is deformably curved away from the interior 34 into the outer end position 40 that is indicated in dash-dotted line in FIG. 1

When an underpressure is produced in the interior 34 relative to the pressure in the environment 36, the membrane section 24 is deformably curved toward the interior 34 into the inner end position 38 indicated in FIG. 1 in dash-dotted line.

Pressure differences between the interior 34 and the environment 36 of up to approximately 20 mbar are compensated in this way solely by deformation of the membrane section 24. For greater pressure differences, a pressure compensation takes place by means of the above described gas exchange through the membrane 18.

Upon surpassing a pre-determined burst overpressure or a burst underpressure, the membrane 18 will rip and thereby fail, releasing the overpressure or underpressure and, in this way, prevent that the battery housing 14 is permanently plastically deformed and possibly becomes leaky.

In operation of the battery 10 under rough operating conditions, dirt, mud, and/or water can pass into the antechamber 30 and deposit on the exterior side of the membrane 18. Mud can form a crust on the membrane when operation is interrupted for an extended period of time.

With the above described deformation of the membrane section 24 during operation of the battery 10, the mud crust is broken up. Dirt and moisture are shaken off from the exterior side of the membrane section 24. Dirt and water drop through the discharge opening 32 in downward direction out of the protective cap 26. The membrane section 24 cleans itself in this way.

During operation of the battery 10, the membrane section 24 can be deformed not only by pressure fluctuations. In operation of the electric vehicle, operational vibrations, for example, when traveling, cause the battery 10 and thus the membrane section 24 to be shaken and thereby flexed or deformed. As a result, the membrane section 24 flutters so that deposition of dirt and moisture on the exterior side is made difficult and already existing deposits are broken up and thrown off.

For producing the venting device 12, the membrane 18 is attached with its membrane edge 20 on the housing section 22 of the battery housing 14 so that the membrane section 24 is stretched flat across the venting opening 16. Subsequently, the protective cap 26 is pushed onto the battery housing 14.

The interior 34 of the battery housing 14 is subsequently loaded with overpressure relative to the environment 36. For this purpose, in the environment 36 an underpressure of approximately 75 mbar and 100 mbar relative to the pressure in the interior 34 of the battery housing 14 is generated. This causes the membrane section 24 to be stretched in axial direction away from the interior 24 to the exterior into the outer end position 40. The membrane section 24 is stretched in this way. In addition or alternatively, the environment 36 can be loaded with overpressure relative to the pressure in the interior 34 so that the membrane section 24 is deformed relative to the interior 34 into the inner end position 38. It is also possible to first generate an overpressure relative to the environment 36 and subsequently an underpressure. The prestraining action of the membrane 18 can also be realized solely by means of overpressure or underpressure. Instead of generating pressure changes in the environment 36, it is also possible to load the interior 34 directly with an appropriate pressure.

The material of which the membrane 18 consists has the property that after prestraining it does not return completely into the original stretched end position. The membrane 18 is thus irreversibly overstretched by this prestraining action. In this way, the membrane section 24 is positioned loosely across the venting opening 16 and is deformable.

Should the membrane 18 be destroyed, for example, as a result of surpassing the burst pressure, it can be exchanged in the following way.

First, the protective cap 26 is removed from the battery housing 14. Subsequently, the membrane 18 is detached from the housing section 22 of the battery housing 14 and the new membrane 18 is inserted. The protective cap 26 is mounted on the battery housing 14. Finally, the membrane 18 is prestrained as described above.

Figure 2:
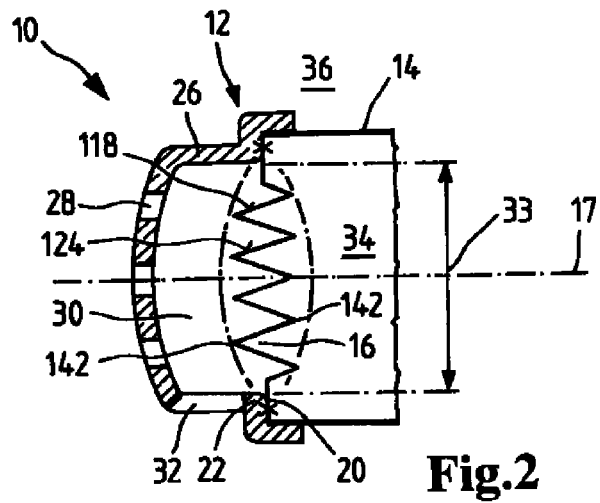
FIG. 2 shows a section of the battery housing of FIG. 1 in the area of the venting device with a membrane according to a second embodiment.
Figure 5:
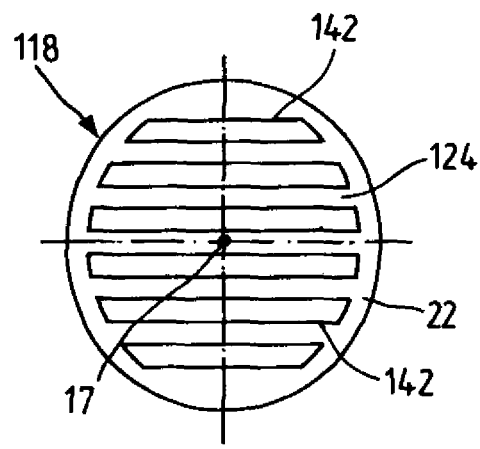
FIG. 5 shows a cross-section of the battery housing of FIG. 1 in the area of the membrane.

In FIG. 2, the battery 10 is shown with venting device 12 provided with a membrane 118 according to a second embodiment. Those elements that are similar to those of the first embodiment of FIG. 1 are provided with the same basic reference numbers but having 100 added. The second embodiment differs from the first embodiment in that the membrane 118 in the membrane section 124 is folded in a Z-shape. Fold edges 142 extend, as shown in FIG. 5 in cross-section, parallel to each other and transversely to the axis 17 of the venting opening 16. In the regular operational orientation of the battery 10 shown in FIG. 2, the fold edges 142 extend horizontally.

When pressure differences between the interior 34 and the environment 36 of less than 20 mbar occur, the folds of the membrane section 124 are unfolded in an accordion-like fashion toward the interior in inward direction or away from the interior in outward direction so that the pressure differences are compensated by unfolding of the membrane section 124. The membrane section 124 is cleaned by its deformation in analogy to the first embodiment of FIG. 1. For larger pressure differences the pressure compensation takes place as in the first embodiment by gas exchange through the membrane 118.

Figure 3:
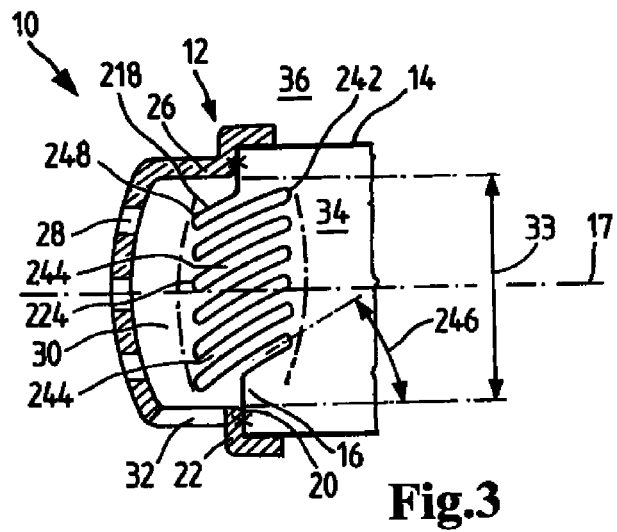
FIG. 3 is a section of the battery housing of FIG. 1 in the area of the venting device with a membrane according to a third embodiment.

In FIG. 3, a third embodiment of a membrane 218 of the venting device 12 of FIGS. 1 and 2 is illustrated. Those elements that are similar to those of the second embodiment of FIG. 2 are provided with the same reference numbers having 100 added. The third embodiment differs from the second embodiment in that the membrane section 224 is folded in an S-shape. From the wide intermediate fold spaces 244 that are realized in this way, dirt and water can be shaken off in a simple way.

The intermediate fold spaces 244 extend at a slant to the axis 17 of the venting opening 16 at an angle 246 of at least 30 degrees. Dirt and water are already caught in a leading dirt area 248 that is facing the antechamber 30. The rearwardly positioned areas of the intermediate fold spaces 244 stay almost free of dirt and water so that the gas permeability of the membrane section 224 is not impaired at this location. From the leading dirt area 248 dirt and water can be thrown off simply by deformation of the membrane section 224, in analogy to the second embodiment of FIG. 2.

Figure 4:
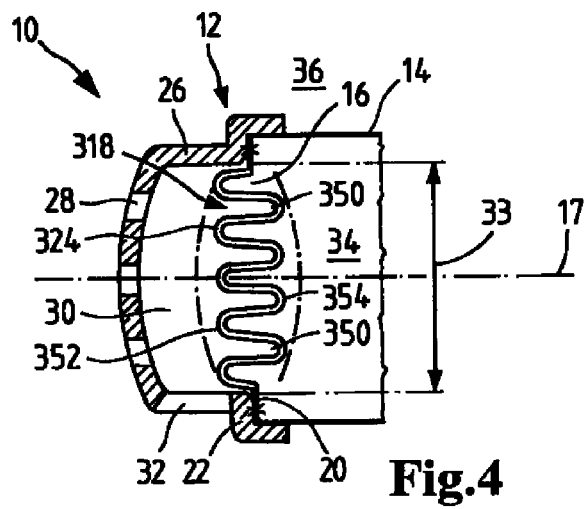
FIG. 4 shows a section of the battery housing of FIG. 1 in the area of the venting device with a membrane according to a fourth embodiment.

In FIG. 4, a fourth embodiment of a membrane 318 is shown which is similar to the membranes 18, 118, 218 according to the first to third embodiments of FIGS. 1 to 3. Those elements that are similar to that of the second embodiment of FIG. 2 are provided with the same reference numbers but have 100 added. The fourth embodiment differs from the second embodiment in that the membrane section 324 has a plurality of grooves 350 that extend horizontally relative to the axis 17 and transversely to the axis 17. By means of the grooves 350 the membrane section 324 can unfold similar to the membrane sections 124 and 224 in the second and third embodiment in FIGS. 2 and 3 for appropriate pressure differences and, in this way, can compensate pressure differences between the interior 34 and the environment 36. In contrast to the first, second and third embodiment of FIGS. 1 to 3, the membrane 318 is of a two-layer configuration. It has on its exterior side that is facing the antechamber 30 an outer coarse layer 352 of a gas-permeable nonwoven. On its inner side that is facing the interior 34 of the battery housing 14, the membrane 318 has a fine layer 354 of a gas-permeable and liquid-impermeable membrane material.

In FIG. 5, a fifth embodiment of a membrane 418 of the venting device 12 of the battery 10 is shown in cross-section. Similar to the fourth embodiment according to FIG. 4, membrane section 424 has a plurality of grooves 450. Those elements that are similar to those of the fourth embodiment of FIG. 4 are identified with the same reference numbers having 100 added. In contrast to the fourth embodiment, in the fifth embodiment the grooves 450 extend along closed curves 451.

Figure 6:
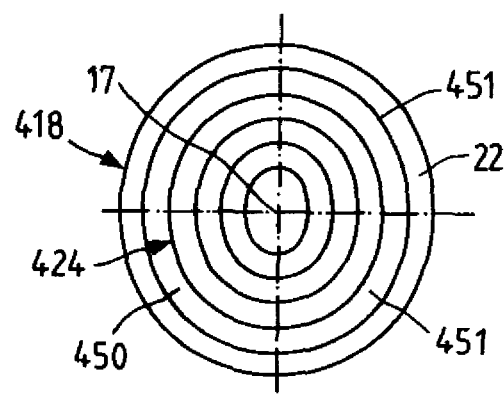
FIG. 6 shows a cross-section of the battery housing of FIG. 1 in the area of membrane according to a fifth embodiment.

In FIG. 6, the illustrated curves are approximately oval. Instead, the grooves 450 can also extend along preferably concentric circles around axis 17.

In all of the above embodiments of a venting device 12 and a method for producing same, the following modifications are possible.

The invention is not limited to venting devices 12 of battery housings 14 of electric vehicles. Instead, it can be used also for other types of housings in which a pressure compensation by means of gas exchange is to take place without allowing passage of moisture into the housing or liquid flow out of the housing. For example, the invention can also be used in electrical switch boxes or power distribution boxes.

The venting opening 16, instead of being circular and having rotational symmetry relative to an imaginary axis 17, can also have a different geometric shape, for example, elliptical or angular shape.

The membranes 18, 118, 218 of the first to third embodiments according to FIGS. 1 to 3 can be designed similar to the fourth embodiment of FIG. 4 of a multi-layer configuration. It is possible to have more than two layers.

The membrane 318 according to the fourth embodiment can be of a single layer configuration similar to the membranes 18, 118, 218 according to the first three embodiments.

The membranes 118, 218, 318, 418, instead of being folded or provided with grooves 350, 450, can also be corrugated or embossed.

Instead of being exchangeable, the membranes 18, 118, 218, 318, 418 can also be attached non-detachably to the battery housing 14.

The venting opening 16, instead of being circular, can also have a different shape, for example, can be angular or oval.

The membranes 18, 118, 218, 318, 418 instead of being vertical can also be oriented at a slant or horizontally.

The axial thickness of the membrane 18; 118, 218, 318, 418 can also be greater or smaller than 0.5 mm, in particular as a function of the type of material.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A venting device for a housing, the venting device comprising:
   a gas-permeable and liquid-impermeable membrane attached to a housing having a venting opening so as to close off the venting opening;
   said membrane having a membrane section that overlaps and covers the venting opening;
   said membrane section having a predetermined bursting pressure;
   said membrane section deforming without being destroyed when pressure differences between the interior of the housing and the external environment occur that are below said bursting pressure and when gas passes through said membrane section;
   wherein said membrane section is folded, corrugated, or embossed;
   wherein the membrane section is irreversibly overstretched on the vent opening by prestraining such that the membrane section is positioned loosely across the vent opening, the overstretched membrane section unfolding in an inward direction toward the interior of the housing or away from the interior in an outward direction so that pressure differences are compensated by the unfolding of the overstretched membrane section.

2. The venting device according to claim 1, wherein said membrane section is elastic.

3. The venting device according to claim 1, wherein a surface area of said membrane section is greater than an venting area of a bore of the venting opening.

4. The venting device according to claim 1, wherein said membrane section is folded;
   wherein said folds are S-shaped folds or Z-shaped folds.

5. The venting device according to claim 4, wherein said folds have fold edges formed at peaks or troughs of said folds;
   wherein said fold edges are arranged parallel to each other and extend on said membrane section transversely to an axis of the venting opening.

6. The venting device according to claim 5, wherein, in an operational orientation of the housing,
   said membrane section is substantially vertically oriented; and
   said fold edges of said folds extend horizontally.

7. The venting device according to claim 5, wherein said fold edges extend along closed curves on said membrane section.

8. The venting device according to claim 5, wherein said fold edges have rotational symmetry.

9. The venting device according to claim 4, wherein outer intermediate fold spaces of said folds extend from a dirt side of said membrane section that is facing away from the interior of the housing to an opposing side of said membrane section that is facing the interior of the housing at a slant angle relative to an axis of the venting opening.

10. The venting device according to claim 9, wherein the angle of said slant is at least 30 degrees.

11. The venting section according to claim 1, wherein said membrane section has grooves.

12. The venting device according to claim 11, wherein said grooves extend parallel to each other and transversely to an axis of the venting opening.

13. The venting device according to claim 11, wherein, in an operational orientation of the housing, said membrane section is substantially vertically oriented and said grooves extend horizontally.

14. The venting device according to claim 11, wherein said grooves extend along closed curves.

15. The venting device according to claim 11, wherein said grooves have rotational symmetry.

16. The venting device according to claim 1, wherein said membrane is of a multi-layer membrane configuration comprising a coarse layer and a fine layer.

17. The venting device according to claim 16, wherein said coarse layer is arranged in the environment and said fine layer is arranged facing the interior.

18. The venting device according to claim 17, wherein said coarse layer is a nonwoven material; and
   wherein said fine layer is a gas-permeable membrane material.

19. A method for producing the venting device having:
   a gas-permeable and liquid-impermeable membrane attached to a housing having a venting opening so as to close off the venting opening;
   said membrane having a membrane section that overlaps and covers the venting opening;
   said membrane section having a predetermined bursting pressure;
   said membrane section deforming without being destroyed when pressure differences between the interior of the housing and the external environment occur that are below said bursting pressure and when gas passes through said membrane section; the method comprising:
   providing a housing having a venting opening;
   providing a flexible deformable membrane, where the membrane is gas permeable and liquid-impermeable, the membrane having a deformable membrane section surrounded by a membrane edge;
   attaching the membrane along the membrane edge flat onto the housing and covering the venting opening such that so that the venting opening is closed off tightly by the membrane and the membrane section overlaps and covers the venting opening;

prestraining the membrane by loading an interior of the housing with a predetermined controlled overpressure or underpressure relative to an external environment so that the membrane section is deflected inwardly or outwardly and is imparted with a permanent prestrain such that a surface area of the membrane section is greater than the area of the bore of the venting opening and the membrane section is thus irreversibly overstretched and loosely positioned across the venting opening, the membrane deformable to compensate for to pressure differences between the interior of the housing and the environment.

20. The method for producing the venting device according to claim 19, wherein in the step of attaching the membrane:

a surface area of said membrane section is greater than an venting area of a bore of the venting opening;

said membrane section is folded, wherein said folds are S-shaped folds or Z-shaped folds.

21. The method for producing the venting device according to claim 20, wherein in the step providing a flexible deformable membrane:

said folds have fold edges formed at peaks or troughs of said folds, said fold edges extending along closed curves on said membrane section;

wherein in the step of attaching the membrane:

said fold edges are arranged parallel to each other and extend on said membrane section transversely to an axis of the venting opening.

22. The method for producing the venting device according to claim 20, wherein the step providing a flexible deformable membrane:

said membrane section has grooves;

wherein in the step of attaching the membrane:

said grooves extend parallel to each other and transversely to an axis of the venting opening.

23. The method for producing the venting device according to claim 20, wherein in the step providing a flexible deformable membrane:

said folds have fold edges formed at peaks or troughs of said folds, said fold edges extending along closed curves on said membrane section;

wherein in the step of attaching the membrane:

said fold edges are arranged parallel to each other and extend on said membrane section transversely to an axis of the venting opening.

* * * * *